US008115407B2

(12) United States Patent
Chang et al.

(10) Patent No.: US 8,115,407 B2
(45) Date of Patent: Feb. 14, 2012

(54) ADDRESS-FREE DRIVING DEVICE AND LIGHTING FIXTURE SYSTEM

(75) Inventors: Shih-Tung Chang, Tucheng (TW); Chi-Hsien Chou, Sindian (TW)

(73) Assignee: Arc Solid-State Lighting Corporation, New Taipei (TW)

( * ) Notice: Subject to any disclaimer, the term of this patent is extended or adjusted under 35 U.S.C. 154(b) by 1477 days.

(21) Appl. No.: 11/564,802

(22) Filed: Nov. 29, 2006

(65) Prior Publication Data

US 2008/0122588 A1 May 29, 2008

(51) Int. Cl.
*H05B 37/02* (2006.01)
(52) U.S. Cl. ......... 315/291; 315/297; 315/307; 315/312
(58) Field of Classification Search .................. 315/224, 315/247, 291, 294, 299, 307, 312, 317, 318, 315/324
See application file for complete search history.

(56) References Cited

U.S. PATENT DOCUMENTS

| | | | | |
|---|---|---|---|---|
| 6,963,175 | B2* | 11/2005 | Archenhold et al. | 315/291 |
| 7,332,877 | B2* | 2/2008 | Crodian et al. | 315/297 |
| 7,492,108 | B2* | 2/2009 | Garcia et al. | 315/291 |
| 7,550,931 | B2* | 6/2009 | Lys et al. | 315/291 |
| 2002/0047646 | A1* | 4/2002 | Lys et al. | 315/312 |
| 2002/0156704 | A1* | 10/2002 | Kolls | 705/27 |
| 2005/0248299 | A1* | 11/2005 | Chemel et al. | 315/312 |
| 2008/0048950 | A1* | 2/2008 | Lee et al. | 345/82 |

* cited by examiner

*Primary Examiner* — Tung X Le
(74) *Attorney, Agent, or Firm* — Morris Manning & Martin LLP; Tim Tingkang Xia, Esq.

(57) ABSTRACT

An address-free driving device and lighting fixture system are disclosed. The device is applied in controlling a lighting device, and includes a serial interface, a signal converter, a signal processor and a lighting driving unit. The signal converter converts an inputted signal from the serial interface into a digital signal. The signal processor then extracts a controlling data corresponding to the address-free driving device from the digital signal, and determines whether or not the inputted signal from the serial interface can be outputted to another address-free driving device. The lighting driving unit drives the lighting device to illuminate light based on the controlling data. Accordingly, when the lighting devices are electrically and serially connected, the address-free driving device then controls the lighting devices based on the order of series connection.

14 Claims, 9 Drawing Sheets

ADDRESS-FREE DRIVING DEVICE AND LIGHTING FIXTURE SYSTEM

FIELD OF THE INVENTION

The present invention relates to an address-free driving device and lighting fixture system, and more particularly to the lighting fixture system that controls lighting devices connected in serial without ID addressing.

BACKGROUND OF THE INVENTION

DMX (digital multiplex) which is developed by (USITT) United States Institute for Theatre Technology is a communication protocol for controlling stage lighting. More specifically, most lighting control devices are compatible with DMX512.

DMX indicates that data is transmitted from lighting controllers to dimmers and lighting equipment, and allows up to 512 individual channels to be controlled via one signal line. DMX also illustrates asynchronous serial data carried at 250 KB/S (kilobytes per second). Moreover, DMX includes synchronous signals that have a low logic level (logic "0") greater than 44 us (updates/second) followed by a high logic level (logic "1") greater than 44 us and a start code. (For more information, please refer to the standard document introduced by USITT)

The ID address of the stage lighting is usually configured in advance, so the lighting device can receive the content for displaying based on the configured ID addresses. Traditionally, the addresses of devices are controlled by a DIP-Switch (dual in-line package switch) or are configured through communication transmission to configure each DMX control element's ID address. Referring to FIG. 1A, a schematic diagram illustrates the operation of conventional DMX512 lighting fixtures and signaling protocol. These three lighting device are connected in parallel, so all DMX512 lighting fixtures then receive the same signal shown in the FIG. 1B. The signal transmitted to these lighting devices includes an initial signal 14, ID0 data 11, ID1 data 12 and ID2 data 13, the lighting devices must be aware of the ID address corresponding to themselves in advance so as to accurately obtain data.

However, the lighting fixtures installed under water or mounted to external walls of buildings may cause inconvenience due to error ID configurations, and may not be easily disassembled.

To overcome the foregoing shortcomings, the inventor of the present invention based on years of experience to conduct extensive researches and experiment invents an address-free driving device and lighting fixture system, as a method or a basis.

SUMMARY OF THE INVENTION

Briefly, a primary object of the present invention is to provide an address-free driving device for controlling a lighting device, especially for a DMX lighting device. When the DMX lighting devices are electrically and serially connected, the address-free driving device then controls the DMX lighting devices based on the order of series connection after activating the entire system.

To achieve the foregoing object, the address-free driving device comprises a serial interface, a signal converter, a signal processor and a lighting driving unit. The signal converter converts an inputted signal from the serial interface into a digital signal. The signal processor extracts a controlling data which corresponds to the address-free driving device from the digital signal, and determines whether or not the inputted signal from the serial interface can be outputted to another address-free driving device. The lighting driving unit drives the lighting device to illuminate light based on the controlling data.

The serial interface is one selected from the group consisting of RS232, RS422 and RS485. The signal converter is a RS485 to TTL (Transistor-Transistor-Logic) converter. The digital signal is a standard DMX512 signal and the signal processor is a DMX512 signal decoder. The light driving unit further comprises at least one PWM (pulse width modulation) unit and at least one driver. The lighting device includes at least one light emitting diode (LED) lamp or other illumination lamps.

A second object of the invention is to provide a lighting fixture system that is composed of a plurality of lighting devices and a signal generator. The lighting devices are electrically and serially connected. Each of the lighting devices has an address-free driving device that further comprises a serial interface, a signal converter, a signal processor and a lighting driving unit. The signal generator generates a signal with a plurality of controlling data corresponding to the lighting device. The order of the controlling data relates to the order of the lighting devices in series connection. By using the address-free driving device, each of the lighting devices could illuminate light based on the controlling data extracted from the signal.

Other features and advantages of the present invention and variations thereof will become apparent from the following description, drawings, and claims.

DETAILED DESCRIPTION OF THE PREFERRED EMBODIMENTS

Figure 1A:
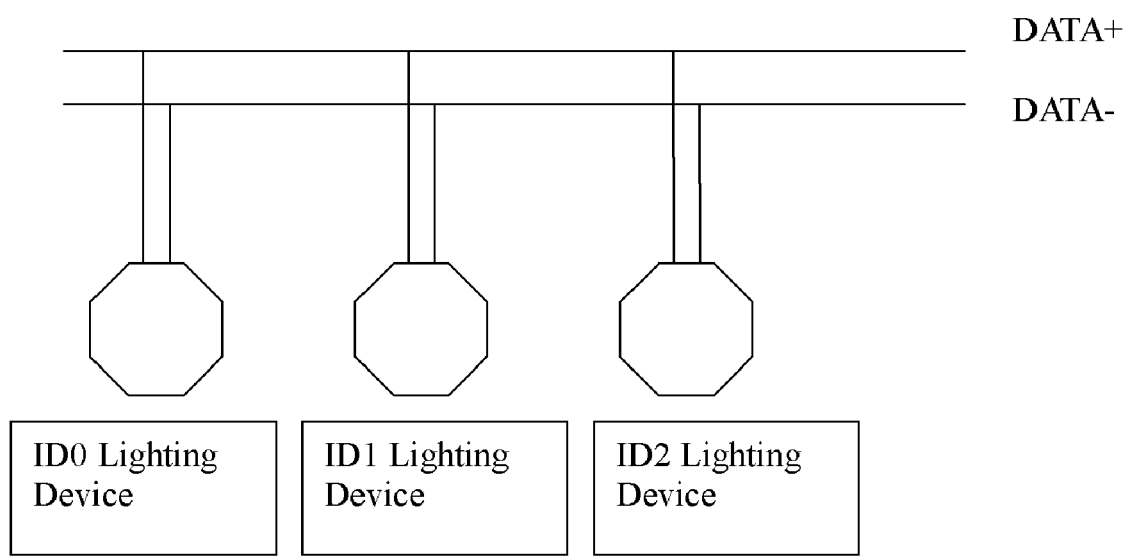
FIG. 1A is a schematic diagram illustrating the operation of conventional DMX512 lighting devices and signaling protocols.
Figure 1B:
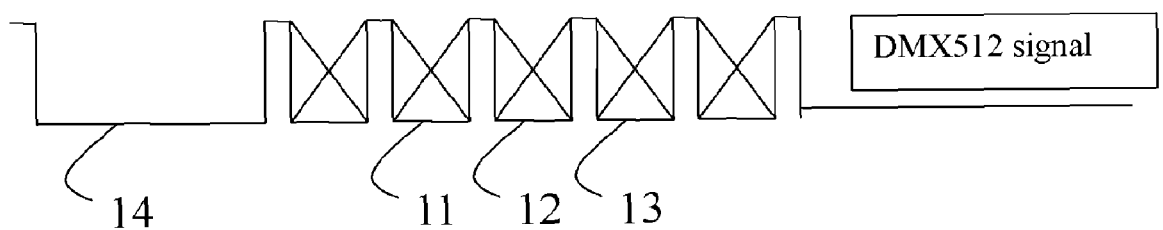
FIG. 1B is a schematic diagram illustrating the signaling protocols.
Figure 2:
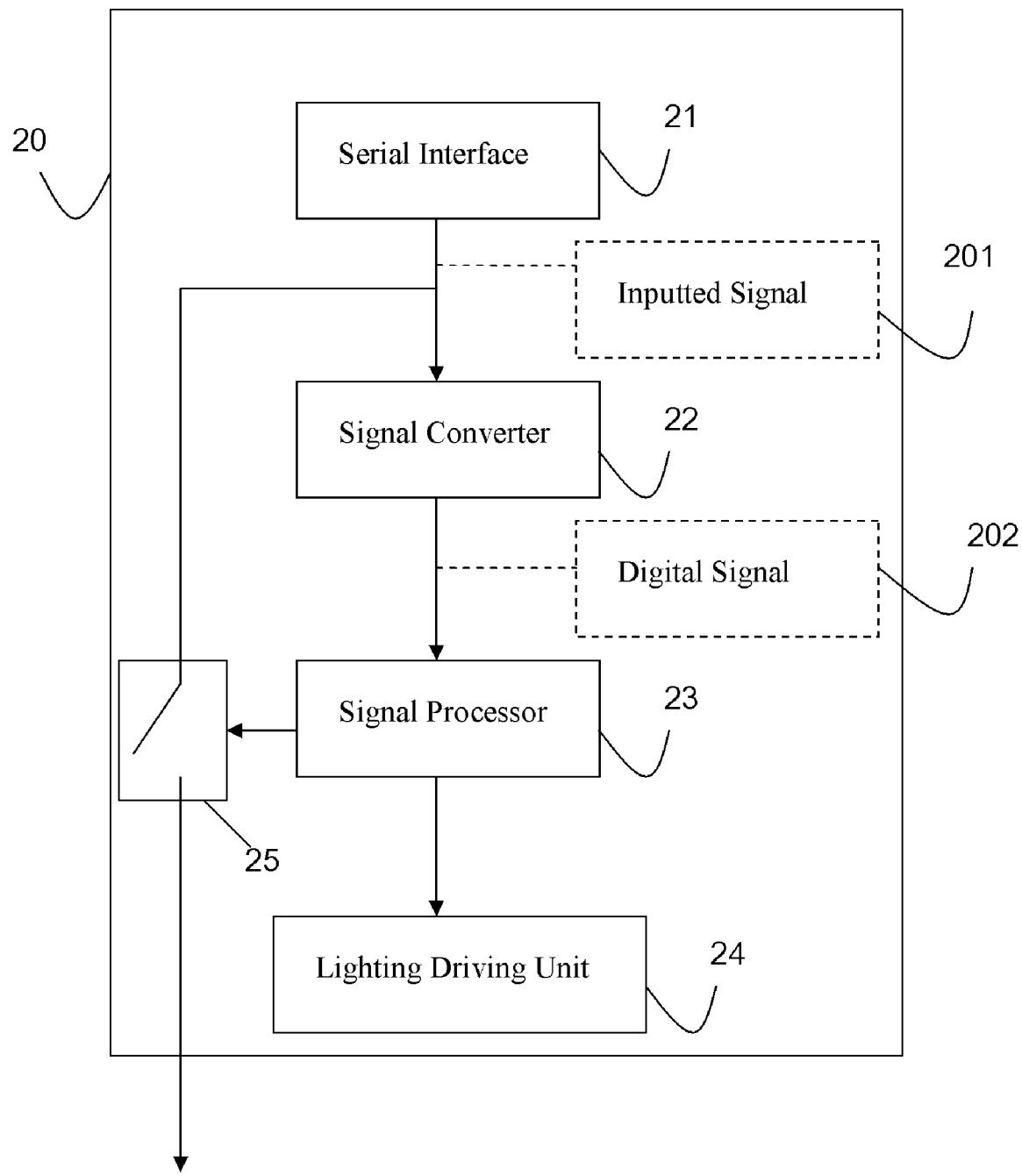
FIG. 2 is a block diagram illustrating an address-free driving device of the invention.

Referring to FIG. 2, a block diagram illustrates an address-free driving device of the invention. The address-free driving device 20 is used to control a lighting device (not shown), and comprises a serial interface 21, a signal converter 22, a signal processor 23 and a lighting driving unit 24. The signal converter 22 converts an inputted signal 201 from the serial interface 21 into a digital signal 202. The signal processor 23 then extracts controlling data corresponding to the address-free driving device 20 from the digital signal 202, and determines whether or not the inputted signal 201 from the serial interface 21 can be outputted to another address-free driving device (not shown). The address-free driving device 20 can includes a switch 25 so that the signal processor 23 can open the switch to output the signal 201 or close the switch to stop outputting the signal 201. Besides, the address-free driving device 20 can includes a second data converter so that the signal processor 23 can enable the second data converter to convert the digital signal 202 into the signal matching the serial interface protocol for outputting or disable the second data converter to stop outputting. The lighting driving unit 24 then drives the lighting device to illuminate light based on the controlling data.

The serial interface 21 is one selected from the group consisting of RS232, RS422 and RS485. The signal converter 22 is preferably a RS485 to TTL converter and the second signal converter is a TTL to RS485 converter. The digital signal 202 is preferably a standard DMX512 signal and the signal processor 23 is a DMX512 signal decoder. The lighting driving unit 24 is composed of at least one PWM unit and at least one driver. Moreover, the driver is preferably a current driver. The lighting device preferably includes at least one LED lamp or other illumination lamps.

Figure 3:
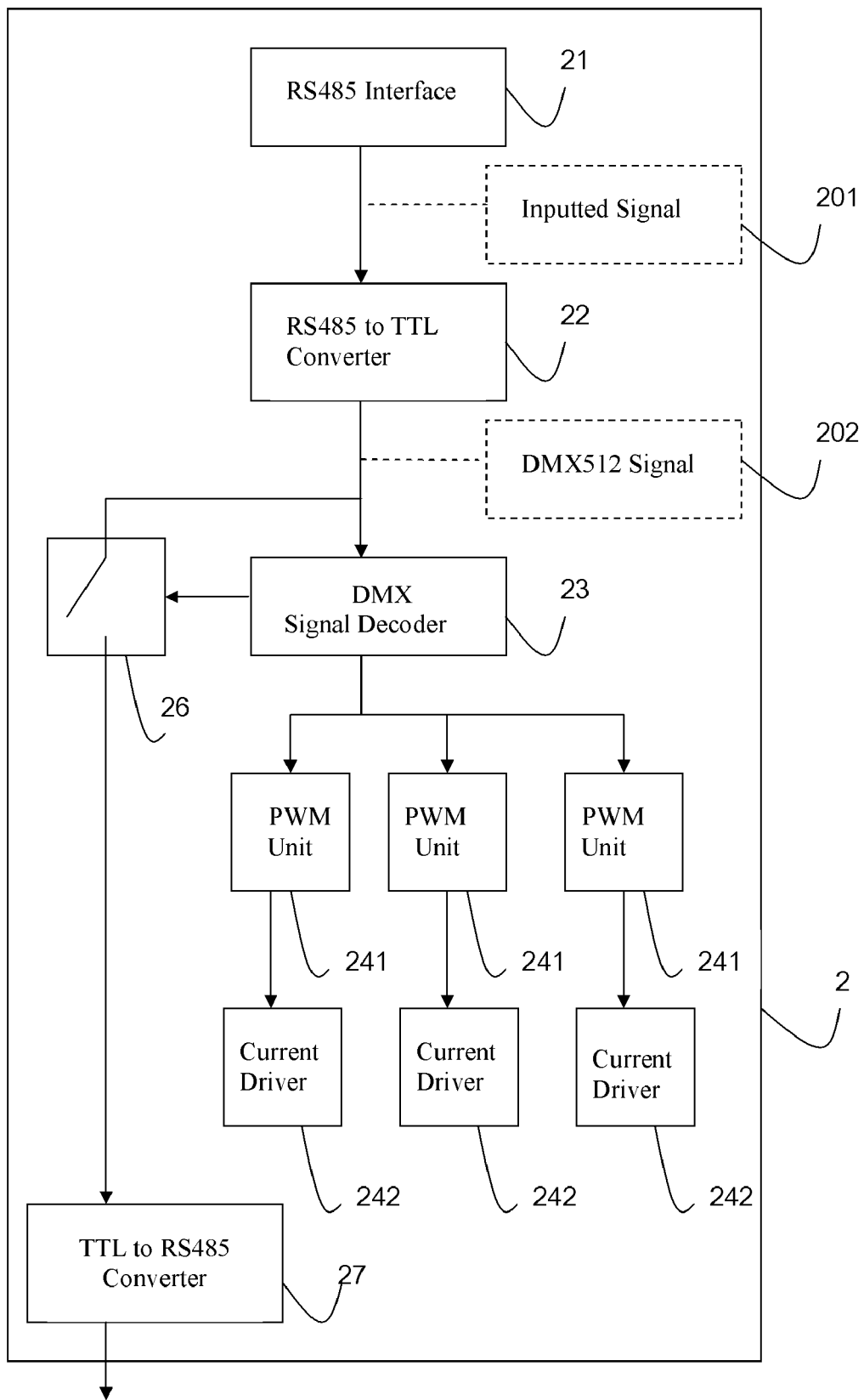
FIG. 3 is a detail block diagram illustrating the address-free device according to a preferred embodiment of the invention.

Referring to FIG. 3, a detail block diagram illustrates the address-free driving device according to a preferred embodiment of the invention. The device 20 includes the serial interface 21, the RS485 to TTL converter 22, the signal decoder 23, three PWM control units 241, three current drivers 242, a switch 26 and a TTL to RS485 converter 27. The inputted single 201 from the serial interface 21 is converted by the RS485 to TTL converter 22 into the DMX512 signal 202. After receiving the DMX512 signal 202, the DMX signal decoder 23 extracts a controlling data which corresponds to the address-free device 20 from the DMX512 signal 202. Before the controlling data is extracted, the DMX signal decoder 23 will controls the switch to open to prevent from the inputted signal 201 being outputted. The DMX signal decoder 23 will controls the switch to close so that the TTL to RS485 converter 27 converts the DMX512 signal 202 into the signal matching RS485 protocol and output the converted signal to another address-free driving device. The three PWM control units 241 then receives the controlling data to generate a duty cycle. According to the duty cycle, the three current drivers 242 then drive the lighting device to illuminate light. For example, the three current drivers 242 can be used to respectively drive a red LED, a green LED and a blue LED included in the light device to generate a desired light color.

Figure 4:
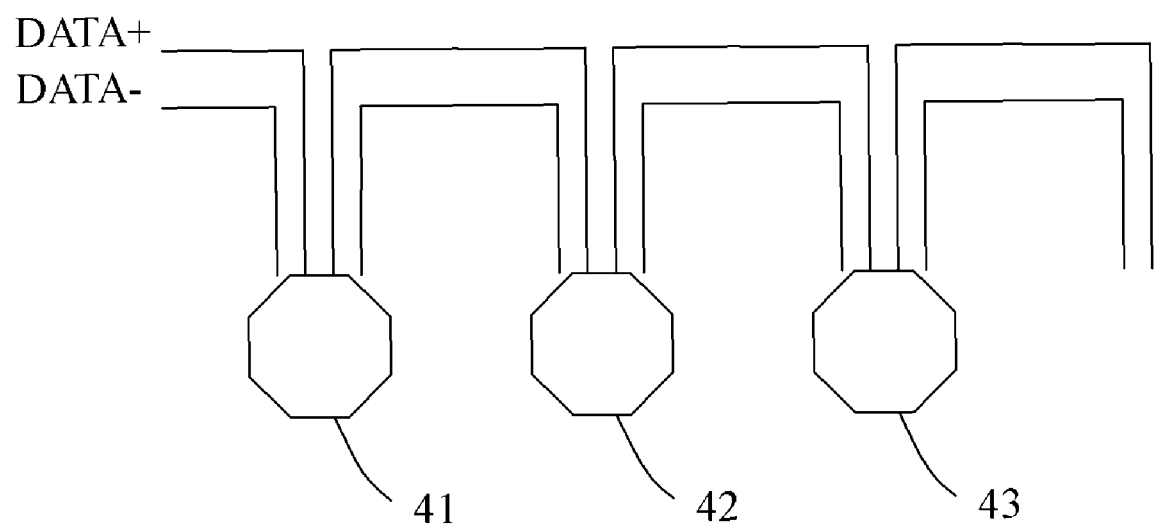
FIG. 4 is a schematic diagram illustrating the address-free driving device for use in the lighting devices.
Figure 5A:
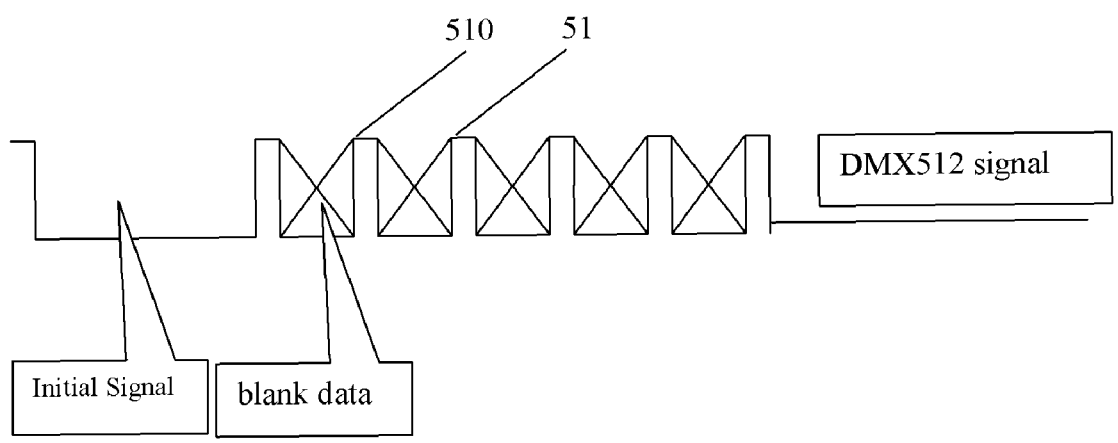
FIG. 5A~FIG. 5C are schematic diagrams illustrating the signaling protocols of the lighting devices connected in serial of the invention.
Figure 5B:
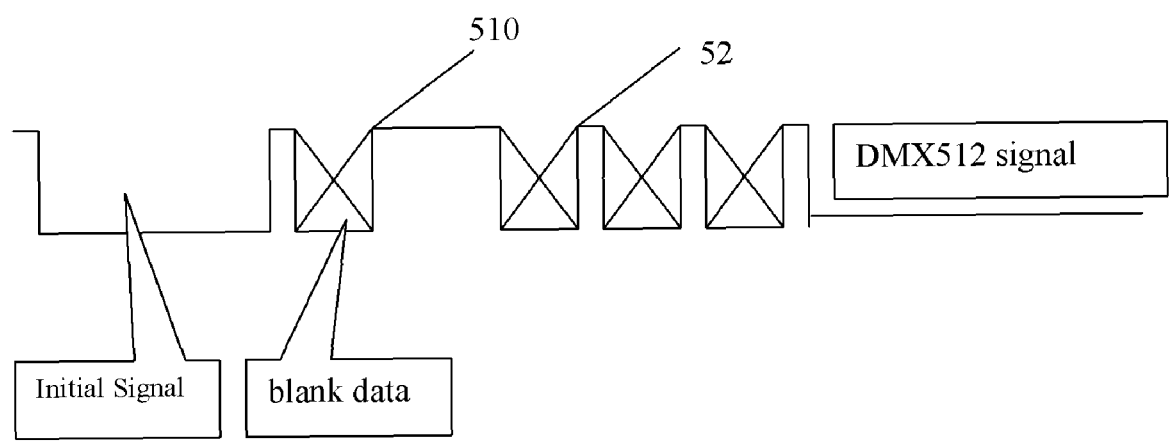
Figure 5C:
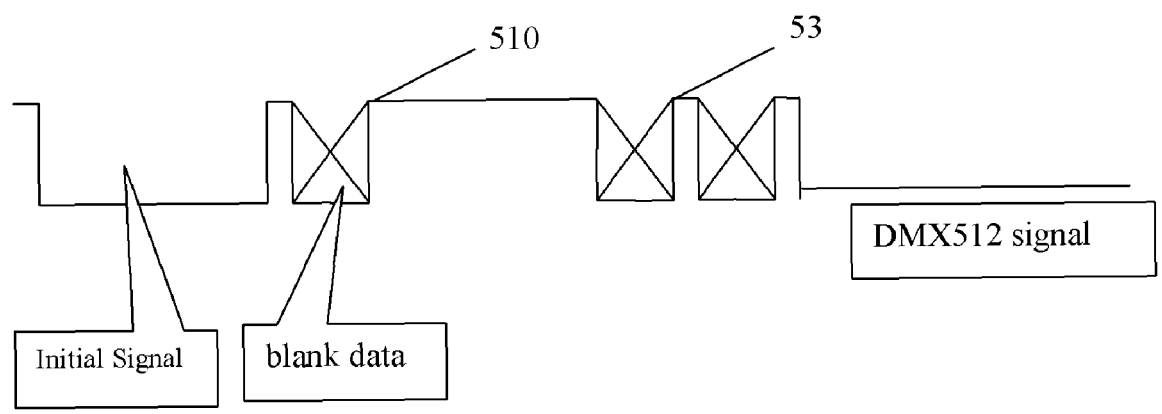

Referring to FIG. 4, a schematic diagram illustrates the connection of the lighting devices with the address-free driving device. The lighting device 41, the lighting device 42 and the lighting device 43 are electrically connected in series connection. Referring to FIG. 5A, FIG. 5B and FIG. 5C, schematic diagrams illustrate the signal transmitted to the lighting device 41, the lighting device 42 and the lighting device 43 respectively. After receiving an initial signal and blank data (1 byte) which are contained in the DMX512 signal, the lighting device 41 will prevent the DMX512 signal from being transmitted until a controlling data is obtained. In FIG. 5A, the DMX512 signal is stopped being transmitted at point 510 and restarted to be transmitted at point 51. The determination is decided by the DMX signal decoder as shown in FIG. 3.

The signal shown in FIG. 5B is different from the signal shown in FIG. 5A, because the lighting device 42 is connected behind the lighting device 41 in serial and the lighting device 41 prevents the DMX512 signal from being transmitted in a period. Similar to the light device 41, the lighting device 42 will prevent the DMX512 signal from being transmitted until a controlling data is obtained after receiving an initial signal and blank data (1 byte) which are contained in the DMX512 signal. In FIG. 5B, the DMX512 signal is stopped being transmitted at point 510 and restarted to be transmitted at point 52. Similar to the light device 41 and the lighting device 42, the lighting device 43 also prevent the DMX512 signal from being transmitted until a controlling data is obtained after receiving an initial signal and blank data (1 byte) which are contained in the DMX512 signal. In FIG. 5C, the DMX512 signal is stopped being transmitted at point 510 and restarted to be transmitted at point 53.

By the above-mentioned process, signals received by other lighting devices could follow the aforesaid sequence. Therefore, if the order of the controlling data included in the DMX512 signal is related to the order of the lighting device in series connection, these lighting devices do not need to know their ID in advance, and could obtain data by turns according to the order of series connection.

Figure 6:
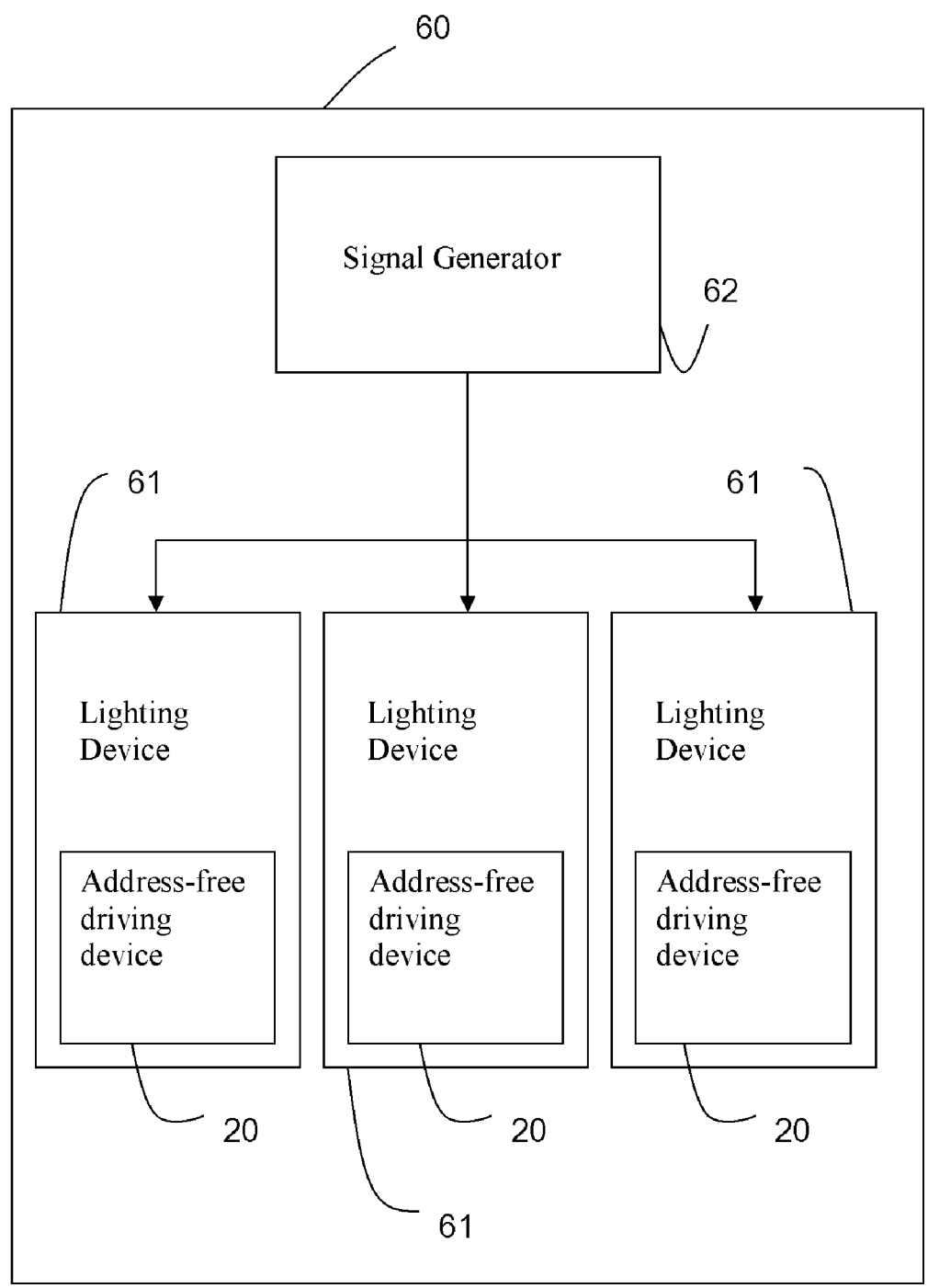
FIG. 6 is a block diagram illustrating a lighting fixture system of the invention.

Referring to FIG. 6, a block diagram illustrates a lighting fixture system of the invention. The system 60 comprises a plurality of light devices 61 such as the ID0 lighting device, the ID1 lighting device and the ID2 lighting device, and a signal generator 62. The lighting devices 61 are electrically and serially connected as shown in FIG. 4. Each of the lighting devices has an address-free driving device 20 as shown in FIG. 2 and FIG. 3. The signal generator 62 is used to generate a signal with a plurality of controlling data corresponding to the lighting devices 61. Moreover, the order of the controlling data relates to the order of the lighting devices in series connection. By using the address-free driving device 20, each of the lighting devices illuminates light based on the controlling data extracted from the signal.

The address-free driving device 20 further includes the serial interface 21, the signal converter 22, the signal processor 23 and the lighting driving unit 24 as shown in FIG. 2. The signal converter is preferably a RS485 to TTL converter, and is used to convert the signal received through the serial interface 21 into a digital signal. The signal processor extracts the controlling data from the digital signal, and determines whether or not the signal from the serial interface 21 can be outputted to another address-free driving device. The lighting driving unit 24 is used to drive the lighting device to illuminate light, and is composed of at least one PWM unit and at least one driver. The digital signal is a standard DMX512 signal and the signal processor is preferably a DMX signal decoder. The serial interface is one selected from the group consisting of RS232, RS422 and RS485. The lighting device 61 preferably includes at least one LED lamp or other illumination lamps.

Although the features and advantages of the embodiments according to the preferred invention are disclosed, it is not limited to the embodiments described above, but encompasses any and all modifications and changes within the spirit and scope of the following claims.

What is claimed is:

1. An address-free driving device, applicable for controlling a lighting device, the address-free device comprising:
   a serial interface;
   a signal converter for converting an inputted signal from the serial interface into a digital signal;
   a signal processor for extracting a controlling data corresponding to the address-free driving device from the digital signal;
   a switch being electrically connected to the signal processor, wherein the signal processor controls the switch to be open before extracting the controlling data; and
   a lighting driving unit for driving the lighting device to illuminate light based on the controlling data.

2. The address-free driving device of claim 1, wherein the serial interface is one selected from the group consisting of RS232, RS422 and RS485.

3. The address-free driving device of claim 1, wherein the signal converter is a RS485 to TTL converter.

4. The address-free driving device of claim 1, wherein the digital signal is a standard DMX512 signal and the signal processor is a DMX512 signal decoder.

5. The address-free driving device of claim 1, wherein the lighting driving unit is composed of at least one PWM (pulse width modulation) unit and at least one driver.

6. The address-free driving device of claim 5, wherein the driver is a current driver.

7. The address-free driving device of claim 1, wherein the lighting device includes at least one light emitting diode (LED) lamp or other illumination lamps.

8. A lighting fixture system comprising:
   a plurality of lighting devices being electrically and serially connected, each of the lighting devices having an address-free driving device comprising a serial interface, a signal converter, a signal processor, a switch and a lighting driving unit, wherein the signal converter is used to convert a signal received through the serial interface into a digital signal, the signal processor is used to extract one of a plurality of controlling data from the digital signal, the signal processor controls the switch to be open before extracting the controlling data, and the lighting driving unit is used to drive the lighting device to illuminate light based on the extracted controlling data; and
   a signal generator for generating the signal having the plurality of controlling data corresponding to the lighting devices, wherein the order of the controlling data relates to the order of the lighting devices in series connection.

9. The lighting fixture system of claim 8, wherein the signal converter is a RS485 to TTL (Transistor-Transistor-Logic) converter.

10. The lighting fixture system of claim 8, wherein the lighting driving unit is composed of at least one PWM unit and at least one driver.

11. The lighting fixture system of claim 10, wherein the driver is a current driver.

12. The lighting fixture system of claim 8, wherein the digital signal is a standard DMX512 signal, and the signal processor is a DMX512 signal decoder.

13. The lighting fixture system of claim 8, wherein the serial interface is one selected from the group consisting of RS232, RS422 and RS485.

14. The lighting fixture system of claim 8, wherein the lighting device includes at least one a LED lamp or other illumination lamps.

* * * * *